United States Patent [19]

Shephard

[11] 4,211,451
[45] Jul. 8, 1980

[54] SEAT RECLINING MECHANISM

[75] Inventor: Philip C. Shephard, Coventry, England

[73] Assignee: I. H. W. Engineering Limited, Warwick, United Kingdom

[21] Appl. No.: 940,965

[22] Filed: Sep. 8, 1978

Related U.S. Application Data

[63] Continuation-in-part of Ser. No. 781,103, Mar. 25, 1977, abandoned, which is a continuation-in-part of Ser. No. 653,659, Jan. 30, 1976, abandoned.

[30] Foreign Application Priority Data

Feb. 7, 1975 [GB] United Kingdom ............... 05235/75

[51] Int. Cl.$^2$ .............................................. A47C 1/025
[52] U.S. Cl. ...................................... 297/362; 16/143; 74/801; 297/379
[58] Field of Search ............... 297/361, 362, 366, 367, 297/373, 374, 354, 355, 379; 16/129, 139, 140, 143; 74/750 R, 801, 803, 804, 805

[56] References Cited

U.S. PATENT DOCUMENTS

| | | | |
|---|---|---|---|
| 2,192,881 | 3/1940 | Bothezat | 74/803 |
| 2,721,591 | 10/1955 | Criswell | 74/750 R X |
| 3,116,651 | 1/1964 | Hardy | 74/750 R X |
| 3,352,177 | 11/1967 | Cleff et al. | 74/801 |
| 3,401,979 | 9/1968 | Putsch | 297/362 |
| 3,432,881 | 3/1969 | Putsch et al. | 297/366 X |
| 3,972,563 | 8/1976 | Gustafsson | 297/362 |
| 4,020,717 | 5/1977 | Johnson | 74/804 |

FOREIGN PATENT DOCUMENTS

| | | | |
|---|---|---|---|
| 1555711 | 10/1969 | Fed. Rep. of Germany | 297/362 |
| 2130768 | 5/1972 | Fed. Rep. of Germany | |
| 2225757 | 12/1972 | Fed. Rep. of Germany | 297/366 |
| 2307495 | 11/1976 | France | 297/362 |
| 373207 | 7/1939 | Italy | 297/362 |
| 1170708 | 11/1969 | United Kingdom | 16/143 |

Primary Examiner—William E. Lyddane
Attorney, Agent, or Firm—Miller & Prestia

[57] ABSTRACT

A seat reclining mechanism comprises first and second hinge plates for mounting on a seat and a back-rest respectively, and an internally toothed ring gear on each of the hinge plates. One ring gear has more teeth than the other ring gear, and a drive gear extends within the two ring gears. Further provided are means for engaging the drive gear and the ring gears, which includes at least one planetary gear in mesh with both ring gears and the drive gear, and means for rotating the drive gear to effect relative angular adjustment of the two hinge plates. In another embodiment of the present invention a drive gear is within the space within the two ring gears, and a pair of carrier members sandwich the drive gear therebetween. The carrier members position and locate the one or more planetary gears, and further provide a floating nature to the operation of the mechanism which compensates for wear of the gears.

15 Claims, 7 Drawing Figures

SEAT RECLINING MECHANISM

CROSS REFERENCE TO RELATED APPLICATIONS

This application is a continuation-in-part of application Ser. No. 781,103 filed on Mar. 25, 1977, now abandoned, which is itself a continuation-in-part of application Ser. No. 653,659 filed Jan. 30, 1976 and now abandoned.

BACKGROUND OF THE INVENTION

1. Field of the Invention

This invention relates to a seat reclining mechanism.

2. Description of the Prior Art

Seat reclining mechanisms are available for vehicle seats, which provide for angular adjustment of the seat proper and the backrest by rotation of a gear in a gear arrangement which is self-locking in the adjusted position.

Such a mechanism is described in U.K. patent application No. 1,091,944. Its construction includes two hinged plates with an internally toothed ring gear on one plate and a spur gear mounted for eccentric motion on the other plate and engaged with the ring gear. Adjustment is achieved by a difference in the numbers of teeth on the two gears. A disadvantage of this construction is that the plates move eccentrically, this movement being transmitted to the backrest, in use, the backrest making what has been termed as "waltzing" movement.

Another construction of a seat reclining mechanism is described in U.K. Patent specification No. 1,170,708 to Recaro. Recaro's disclosure provides a ring gear on each plate and two spur gears which are rotated simultaneously and eccentrically and engage respectively the two ring gears. This construction avoids the "waltzing" disadvantage, but is more expensive to produce. Another embodiment uses a small gear carried on an arm to engage the ring gears. This construction is insufficiently strong, since a large force is carried by the teeth of a small gear. The small gear or its carrying arm is liable to break, or the small gear will be forced out of a locking position, so that the backrest collapses.

Disclosed in the German Patent specification No. 1,555,711 is another structure of a seat reclining mechanism. This construction also has ring gears on the two hinge plates, but a gear carrier is provided mounting four small gears on a circle. Each of these small gears is a composite gear formed of two integral gears having their teeth offset. One integral gear of each of the four composite gears is engaged with one ring gear and the other integral gear of each composite gear is engaged with the other ring gear. The gear carrier is rotated so that the composite gears roll along the ring gears and rotation is achieved by a further gear engaged with external teeth on the gear carrier. The composite gears are very difficult to make and consequently very expensive as one of the integral gears contains eight teeth, while the other integral gear contains only seven teeth. Accordingly, it is also impossible to use a single central control gear to engage fully both of the integral gears of each composite gear. This construction also suffers the disadvantage of having a total of twelve gears, including the carrier, making the mechanism as a whole very expensive to produce.

U.S. Pat. No. 3,972,563 to Gustaffsson, discloses a seat-back tilt adjustment mechanism wherein ring gears are provided on the two hinge plates. In one embodiment there is one planetary gear mounted on a carrier and engaged with both ring gears. This works theoretically, but is impractical for the same reasons as the Recaro construction having one planetary gear, i.e., it would be insufficiently strong to support the force exerted by a person leaning on the backrest of the seat. Gustaffsson also describes an arrangement wherein the carrier carries three planetary gears. This is also impractical for other reasons. There has to be a difference of three teeth between the two ring gears and with the construction illustrated there should be a movement of 30 degrees between the plates for each revolution of the control knob. The force needed to do this is far too large for an average person. Furthermore, the arrangement would not be self-locking and the backrest would collapse in use. A large increase in the number of teeth on the ring gears would avoid these problems, by reducing the angular movement of the hinge plates per revolution of the control knob, but then the teeth would be too weak for the purpose and also the gears would be far too expensive to produce. Cheaper methods such as fine blanking techniques not being possible.

The above and other problems inherent in the prior art are solved by the present invention which provides an improved seat reclining mechanism.

SUMMARY OF THE INVENTION

In accordance with this invention, a seat reclining mechanism comprises first and second hinge plates for mounting on a seat and backrest respectively, an internally toothed ring gear on each of the hinge plates, one ring gear having more teeth than the other ring gear. A drive gear extends within the two ring gears, and means is provided engaged between the drive gear and the ring gears and including at least one planetary gear in mesh with both ring gears and the drive gear. Further, means are provided for rotating the drive gear to effect relative angular adjustment of the two hinge plates. The means engaged between the drive gear and the ring gears may include rollers, but preferably includes a plurality of planetary gears.

In another embodiment of the seat reclining mechanism of the present invention, the drive gear is also positioned within the space within the pair of ring gears. The drive gear is mounted on a shaft. The drive gear is sandwiched between a pair of carrier members each having a central aperture complementary to the shaft so that it can freely rotate on the shaft. Each of the carrier members includes a plurality of partially circular, equiangularly spaced openings which form a plurality of radially extending arms having substantially concave surfaces extending between neighboring arms. Planetary gears are snugly received between neighboring arms and are in contact with the concave surfaces of the carrier members and meshed with the drive gear and with both of the ring gears. The floating nature of these carrier members compensates for any wear on the gears and for manufacturing tolerances. Furthermore, the concave surfaces of the support portions of the carrier members function as ramps so that the planetary gears tend to climb the surfaces, which thereby tends to urge the planetary gears into mesh with the ring gears so that no slippage occurs.

BRIEF DESCRIPTION OF THE DRAWINGS

Reference is now made to the accompanying drawings, wherein.

DETAILED DESCRIPTION OF THE PREFERRED EMBODIMENTS

Figure 1:
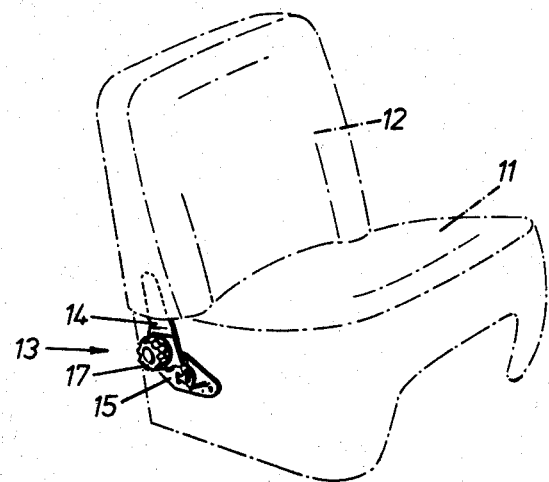
FIG. 1 is a perspective view of a first embodiment of a seat reclining mechanism according to the invention, shown in its position of use on a vehicle seat.

Referring to FIG. 1, a vehicle seat is shown having a seat 11 and a backrest 12, the backrest being angularly adjustable vertically relative to the seat 11. Adjustment is effected by a first embodiment of the seat reclining mechanism 10 of the present invention, which includes a first hinge plate 14 hinged to a second hinge plate 15. The first hinge plate is mounted on the backrest 12 and the second hinge plate 15 is mounted on the seat 11. A knob 17 is provided, the rotation of which effects adjustment of the inclination of the backrest. Further, hinge plates may be provided on the opposite side of the seat, but these need not have the adjustment control. The hinge axis of the plates 14 and 15 is coaxial with the inclination axis of the backrest.

Figure 2:
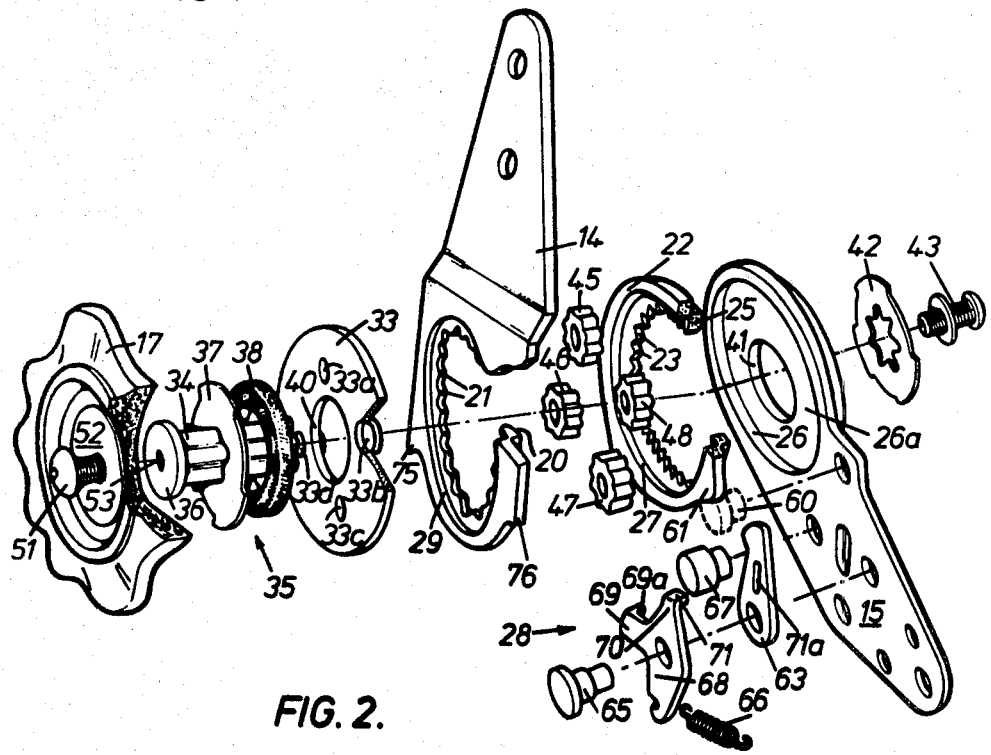
FIG. 2 is an exploded perspective view of the seat reclining mechanism according to the invention on an enlarged scale with certain parts shown cut away in order to reveal important details.

Referring to FIG. 2, the first hinge plate 14 is integrally formed with a first ring gear 20 having inwardly directed teeth 21. The hinge plate 14 defines a coaxial recess 29 adjacent the ring gear 20. The second hinge plate 15 is provided with a second ring gear 22 also having inwardly projecting teeth 23. The second ring gear 22 has an annular boss 25 coaxial with the teeth 23 and boss 25 rotatably engages in a recess 26 in the second hinge plate 15. The second hinge plate 15 is normally fixed with respect to the second ring gear 22 by means of a lever arrangement 28, which is described fully hereafter. The second ring gear 22 also has a recess 27 and the first ring gear 20 rotatably engages in the recess 27.

The recess 29 of the first hinge plate receives and locates a carrier 33. The carrier has pressed-out projections 33a, 33b, 33c, and 33d. A control gear assembly 35 is provided comprising a drive gear 34 provided with a head 36. The drive gear 34 carries a complementary washer 37 and resilient packing 38. Packing 38 may include a resilient rubber "o" ring.

The drive gear 34 extends through an aperture 40 in the carrier 33 and through an aperture 41 in the second hinge plate 15. A further washer 42 is received by the drive gear 34 to consolidate the carrier and hinge plates between the bolt 43 and the head 36.

Before assembly, four planet gears 45–48 are rotatably engaged with respective projections 33a to 33d and are meshed with the drive gear 34, each planet gear also meshing with both of the ring gears 20, 22. It can be seen that due to the resilient nature of packing 38, carrier 33 is slightly adjustable axially to compensate for material thickness inaccuracies. Accordingly, upon use, the user feels a soft, springy response to hand actuation of a knob 17, instead of the jolting type sensation that would be felt if axial adjustment of carrier 33 were provided. The first ring gear 20 has more teeth than the second ring 22, the first ring gear having twenty-five teeth 21 and a second ring having twenty-one teeth 23. The addendum circle defined by each set of teeth 21, 23 is the same and it will be appreciated that there are four positions where teeth of the two sets are aligned. Each planetary gear is located at one of these positions. Hence, where the difference in the number of teeth is three instead of four, three planetary gears would be provided. It is envisaged that only one planetary gear need be provided, but other support means, such as rollers, would be required between the drive gear 34 and the ring gears 20, 22.

The knob 17, in the form of a hand wheel is fixed to the control gear assembly by a bolt 51 and a washer 52, the bolt engaging in a threaded aperture 53 in the drive gear 34.

Hence rotation of the hand wheel 17 causes accompanying rotation of the drive gear 34 and of the planetary gears 45–48, the latter rotating both about their own axes and about the control gear axis. The ring gears 20, 22 are thereby caused angularly to move relatively to each other. In effect, the alignment positions of the teeth 21, 23 move slowly around the main hinge axis. Accordingly, the hinge plates 14, 15 are moved angularly toward or away from each other, depending on the direction of rotation of the hand wheel 17, producing adjustment of the inclination of the backrest 12.

In a vehicle having no rear doors, it is necessary for the backrest to tilt forwardly to permit access to the rear of the vehicle. Provisions for such tilting, independently of the gear arrangement described above, is provided by the lever arrangement 28.

A stop 67 is provided, which can cooperate with one of two projections 75, 76 on the hinge plate 14 to define the extreme limits of relative angular movement of two hinge plates 14, 15. It also cooperates with projection 62 (FIG. 3) to prevent rearward tilting movement.

Figures 3, 4:
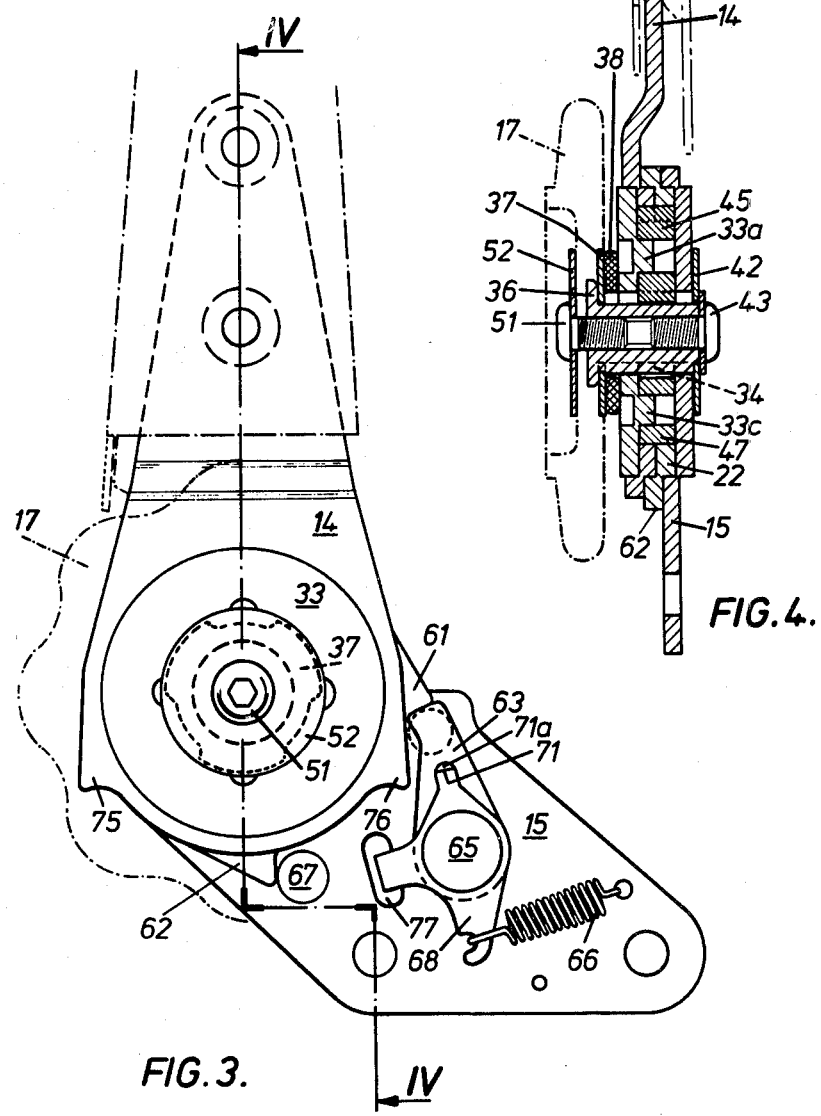
FIG. 3 is a side view of the seat reclining mechanism.
FIG. 4 is a sectional view of the seat reclining mechanism taken on the line IV—IV of FIG. 3.

In addition, the ring gear 22 has a projection 61 which engages with the end of an arm 63, the arm serving as a stop to prevent forward tilting of the backrest, i.e., clockwise angular movement of the hinge plate 14, as seen in FIG. 3. The arm 63 is spring-urged into engagement into a projection 61 by a spring 66 engaged between a lever 68 and the hinge plate 15. The lever 68 has a tongue 71 on a portion 70 engaged in an aperture 71a of the arm for movement of the lever with the arm, both the lever 68 and the arm 63 being pivoted about a common pivot member 65. The lever has a further portion 69 also provided with a tongue 69a which engages in an elongated slot 77 in the hinge plate 15. This slot 77 limits movement of the lever. A rivet 60 is provided on which the arm 63 slides. Rocking of the lever disengages the arm 63 from the projection 61 to permit forward tilting of the backrest. In practice, the lever may be rocked by actuation from a remote position, by connection of an actuator with the lever 68 by a linkage or cable.

Figure 5:
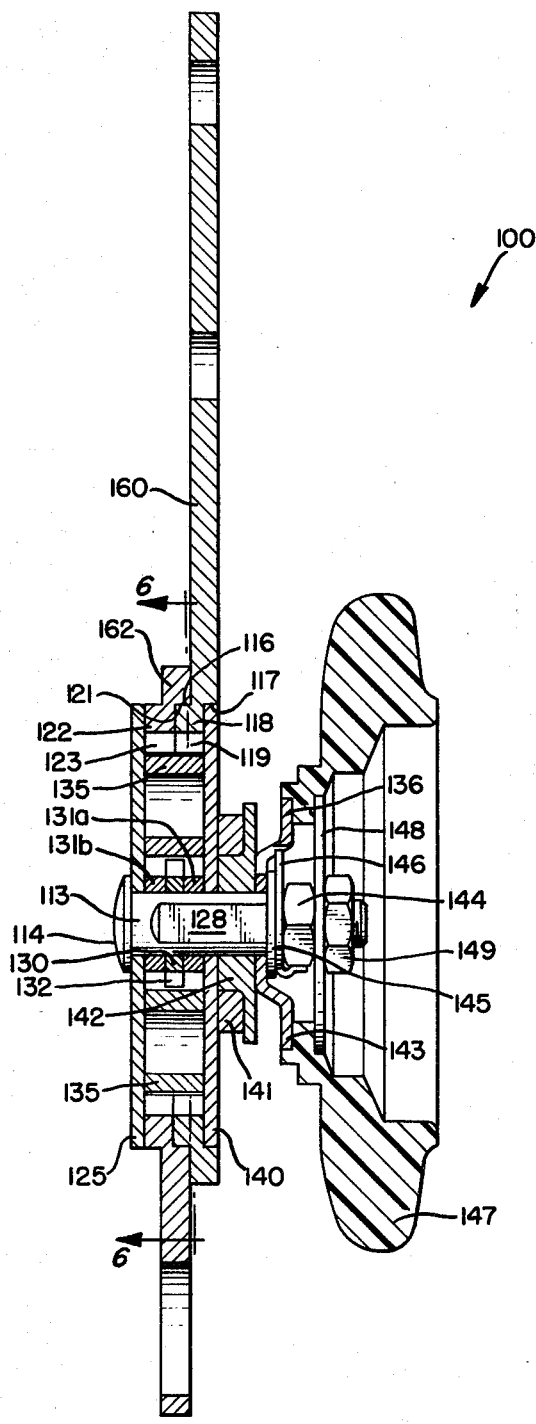
FIG. 5 is a cross-sectional view of a second embodiment of the seat reclining mechanism of the present invention.
Figure 6:
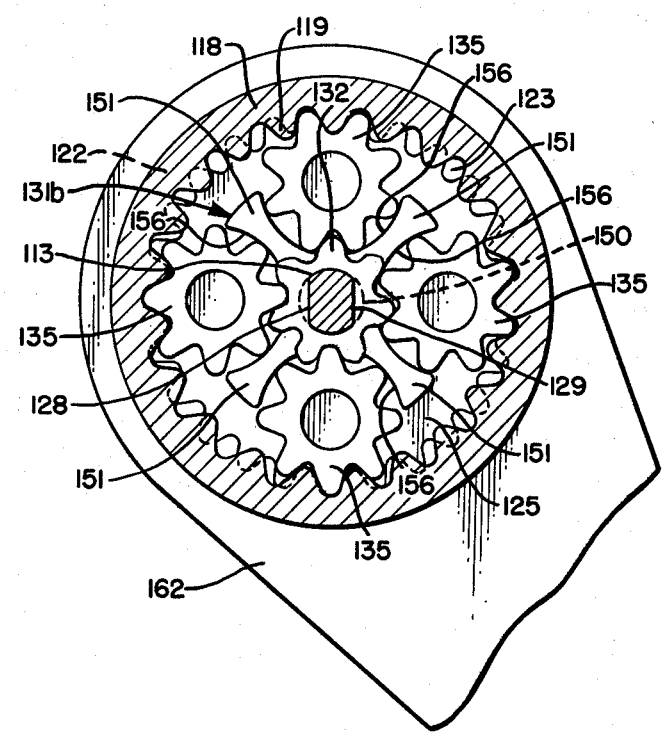
FIG. 6 is an elevational view of the second embodiment of the invention along the line A—A of FIG. 5.
Figure 7:
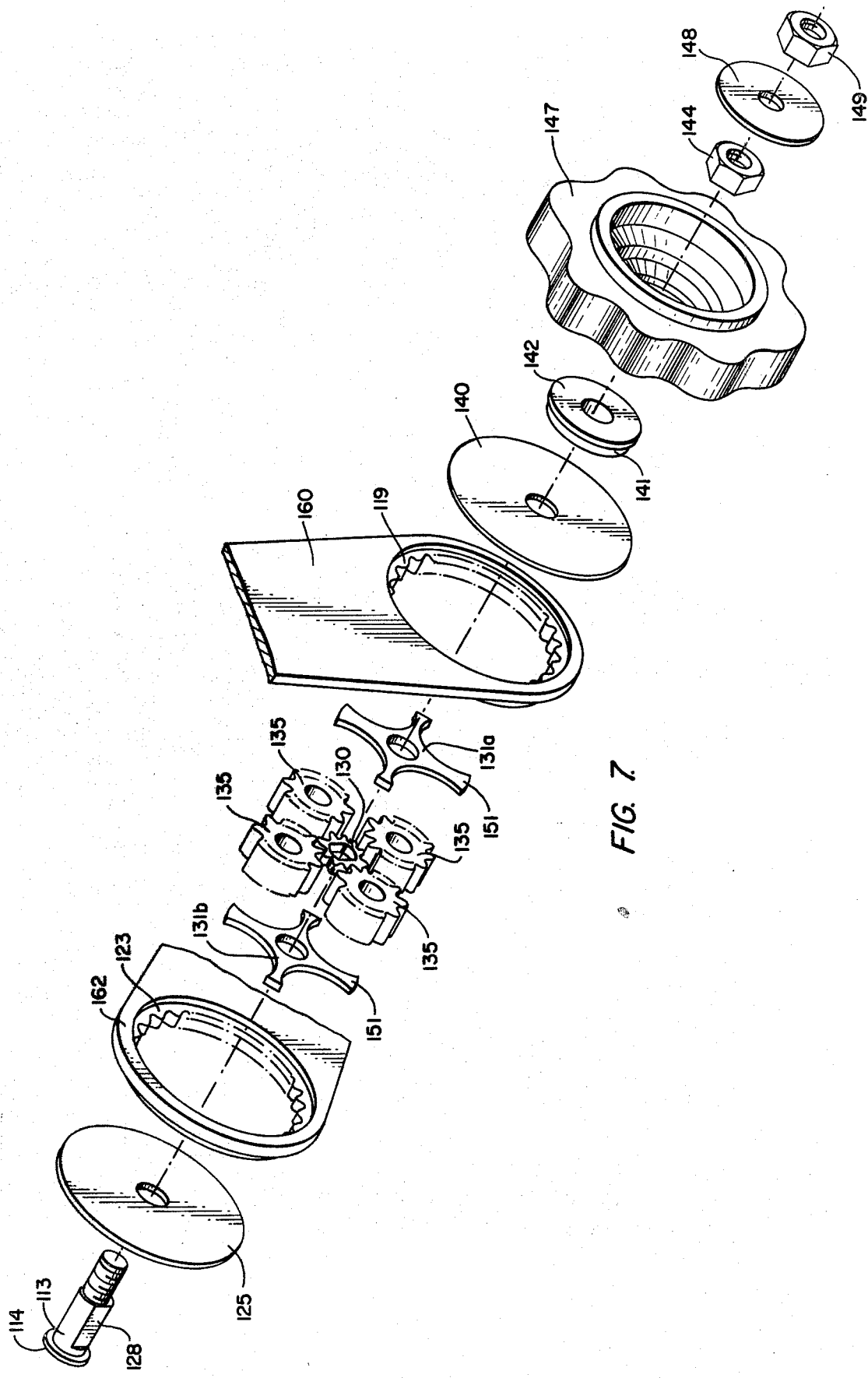
FIG. 7 is an exploded view of the second embodiment appearing in FIGS. 5 and 6 of the drawings.

Referring to FIGS. 5-7, a second embodiment of the seat reclining mechanism of the present invention is designated as 100. The second embodiment of the present invention 100 is very similar in its operation to that of the first embodiment of the present invention. Adjustment to a vehicle seat as shown in FIG. 1, is effected by the seat reclining mechanism 100 having a first hinge plate 160 hinged to a second hinge plate 162 as in the first embodiment of the present invention. The first hinge plate 160 is mounted on the backrest 12 and second hinge plate 162 is mounted on the seat 11. Through the rotation of a hand wheel 147 adjustment is effected in the inclination of the backrest 12. Further details of the second embodiment 100 of the present invention are subsequently discussed.

The first and second hinge plates 160 and 162 are held together by a shaft 113 having a head 114, and a threaded end opposite head 114.

The first hinge plate 160 is integrally formed with a first ring gear 118 having inwardly directed teeth 119. The first hinge plate 160 defines a coaxial recess 117 adjacent to the ring gear 118 with a circular shoulder 116 laterally spaced from the circular recess 117 and also opposite teeth 119 of the first ring gear 118. The second hinge plate 162 includes a second ring gear 122 also having inwardly projecting teeth 123. The second hinge plate 162 also defines a coaxial recess 121 adjacent the second ring gear 122. As the first and second hinge plates 160 and 162 are positioned in the seat reclining mechanism 100, the shoulder 116 mates with and is snugly received in the recess 121.

A circular disc-like plate 125 is between and adjacent head 114 of the shaft 113 and the surface of the second hinge plate 162 opposite the recess 121.

The shaft 113 includes two opposite flat portions designated as 128 and 129. A drive gear 130 is mounted on the shaft 113 and includes an aperture complementary to that portion of the shaft 113 having the flattened portion 128 and 129. Thus, rotation of the shaft 113 will consequently produce a rotation of the drive gear 130.

Meshed between the first and second ring gears 118 and 122 and the drive gear 130 are means for engaging the drive gear and the ring gears which is typically a plurality of planetary gears 135. The planetary gears simultaneously engage both ring gears 118 and 122. For the purpose of describing the present embodiment 100, four planetary gears are shown.

The drive gear 130 is in contact with and sandwiched between a pair of carrier members designated as 131a and 131b. Each of the carrier members is substantially flat and plate like and having a central aperture 150 which is complementary to the shaft diameter so that the shaft 113 can rotate freely about the pair of carrier members 131a and 131b. Furthermore, each of the carrier members has a plurality of spaced curved openings which form a plurality of radially extending arms 151 with substantially concave surfaces 156 thereon. Each of the planetary gears 135 is snugly received between neighboring arms 151 and is in contact with the concave surfaces 156. Thus, the carrier members 131a and 131b with their concave surfaces 156 and radially extending arms 151 separate the planetary gears 135. For example, four arms 151 separate the planetary gears 135 from each other and support and locate the planetary gears within the mechanism 100. In the operation of the reclining mechanism 100, the concave surfaces 156 tend to function as ramps so that the planetary gears 135 tend to climb the concave surfaces, this tendency serving to urge the planetary gears into mesh with the first and second ring gears 118 and 122, so that there is no slipping of the meshing gears even after considerable wear has occurred. Thus, the floating nature of the carrier members 131a and 131b compensates for wear on the gears and for manufacturing tolerances.

A retaining plate 140 has a centrally-located aperture so that it is received by the shaft 113. The retaining plate 140 fits snugly into the circular recess 117, thereby holding the gears in position. A resilient washer 141 having an inside diameter much larger than the diameter of the shaft 113, is located on the retaining plate 140 with the shaft extending therethrough, and a spacer 142 fits snugly into the aperture of the resilient washer 141 and is received by the shaft 113. A location washer 143 is also received by the shaft 113 and is in contact with the spacer 142. The location washer 143 is formed having an outwardly extending flange 136 along its outer periphery. A first and second washer 145 and 146 is received by the shaft 113 and with a nut 144, which is screwable on the threaded end of the shaft 113, bears onto the location washer 143. The washers 145 and 146 are of a small diameter such that they bear down onto the central portion of the location washer 143.

A hand wheel 147, having a central opening from which extend the threaded ends of the shaft 113, is mounted on the location washer 143, and mates with the flange 136. The hand wheel 147 is retained onto the mechanism 100 by a retaining washer 148 and by a nut 149 which screwably engages the threaded end of the shaft 113.

Since the example of the present invention includes four planetary gears 135, each of the carrier members 131a and 131b is of a substantially cross-like configuration.

In the operation of the second embodiment of the present invention, the resiliency of the resilient washer 141 permits rotation of the shaft 113 by the turning of the hand wheel 147. The drive gear 130 is thereby rotated by the rotation of the hand wheel 147, and this motion is consequently transmitted through the planetary gears 135 to the ring gears 118 and 122 so that a small angular movement of the hinge plates 160 and 162 is effected per rotation of the hand wheel 147. Thus, in operation the second embodiment 100 is, in essence, the same as the first embodiment 10. However, unlike the first embodiment, the second embodiment includes a pair of carrier members 131a and 131b which support and locate the planetary gears 135 in meshing relationship with the first and second ring gears 118 and 122 and the drive gear 130. Of most significance, these carrier members 131a and 131b provide this meshing in a floating manner which prevents slipping even when the gears have had considerable wear and thus compensates for wear on the gears and for manufacturing tolerances.

It is anticipated that the second embodiment of the present invention will utilize the same means for tilting forward the backrest as shown in the first embodiment, i.e., lever arrangement 28.

For the purpose of describing the second embodiment 100 of the present invention, it is assumed in a typical structure the first ring gear 118 will have twenty-five teeth and the second ring gear 122 will have twenty-one teeth while each of the four planetary gears will have eight teeth. Also for the purpose of describing the second embodiment it is assumed that the drive gear 130 is about one-third the thickness of the planetary gears 135 and that the carrier members 131a and 131b are of substantially the same thickness and also about one-third the thickness of the planetary gears 135.

Although this invention has been described with reference to specific embodiments thereof, it will be appreciated that various other modifications may be made, including the substitution of equivalent components for those shown and described. Further, the invention comprehends the use of certain features independently of other features, and the substitution of equivalent elements, all of which modifications may be made without departing from the spirit or scope of the invention as defined in the appended claims.

I claim:

1. A seat reclining mechanism comprising:

first and second hinge plates for mounting on a seat and a backrest respectively, said first and second hinge plates in rotatable contact with each other;

a pair of internally toothed ring gears spaced axially apart from each other, one of said internally toothed ring gears being carried on one of the hinge plates and the other being carried on the other of the hinge plates, one of said internally toothed ring gears having more teeth than the other ring gear;

a shaft extending through said pair of ring gears;

a drive gear being in the space within said pair of ring gears, said drive gear being mounted on said shaft;

a plurality of planetary gears in mesh with both of said ring gears and said drive gear;

a pair of carrier members each having a central aperture complementary to said shaft so that said shaft can rotate within each of said carrier members, said carrier members each having a plurality of partially circular, equiangularly spaced openings thereby providing a plurality of radially extending arms with substantially concave surfaces extending between neighboring arms, each of said carrier members being at an opposite side of said drive gear with each of said planetary gears snugly received between neighboring arms and in contact with said concave surface, said concave surfaces constructed to urge said planetary gears into mesh with said ring gears; and means to rotate said shaft and said drive gear to effect relative angular adjustment of the two hinge plates through concurrent meshing of said planetary gears with both of said ring gears.

2. A seat reclining mechanism comprising:

first and second hinge plates for mounting on a seat and a backrest respectively, said first and second hinge plates being rotatable with respect to each other;

a pair of internally toothed ring gears axially spaced apart from each other, one of said internally toothed ring gears being carried on one of the hinge plates and the other being carried on the other of the hinge plates, one of said internally toothed ring gears having more teeth than the other ring gear;

a shaft extending through said pair of ring gears;

a drive gear mounted on said shaft in the space within said pair of ring gears;

a plurality of planetary gears in mesh with both of said ring gears and said drive gear;

means for rotating said shaft and said drive gear to effect relative angular adjustment of the two hinge plates through concurrent meshing of said planetary gears with both of said ring gears; and at least one carrier member movable relative to said shaft and extending between said planetary gears, each said carrier member having surfaces facing and adapted for contacting a portion of the periphery of at least one of said planetary gears to maintain said planetary gears in spaced relationship as they rotate.

3. The seat reclining mechanism in accordance with claim 2, wherein each said carrier member is cross-like in shape and has four concave surfaces, each of said concave surfaces being adapted for contacting one of said planetary gears.

4. The seat reclining mechanism in accordance with claim 2, wherein one of said ring gears has twenty-five teeth and the other ring gear has twenty-one teeth and said drive gear has seven teeth.

5. A seat reclining mechanism according to claim 4, further comprising four planetary gears each having eight teeth.

6. The seat reclining mechanism in accordance with claim 2 wherein means are provided for retaining said drive gear and said planetary gears in said mechanism.

7. The seat reclining mechanism in accordance with claim 2, wherein said means for rotating said shaft and drive gear is a hand wheel mounted to said shaft.

8. The seat reclining mechanism in accordance with claim 2, wherein said drive gear has a thickness about one-third that of said planetary gears and each of said carrier members is of substantially the same thickness and also about one-third the thickness of said planetary gears.

9. The seat reclining mechanism defined in claim 2, wherein each of said carrier members has concave surfaces facing said planetary gears and is shaped to urge said planetary gears toward said ring gears.

10. The seat reclining mechanism defined in claim 2, wherein each of said carrier members has surfaces shaped as ramps causing said planetary gears to climb toward said ring gears.

11. The seat reclining mechanism defined in claim 2, wherein each of said carrier members is floatingly arranged between said planetary gears.

12. The seat reclining mechanism defined in claim 2, wherein each of said carrier members has a central aperture complementary to said shaft.

13. The seat reclining mechanism defined in claim 2 comprising a plurality of carrier members.

14. The seat reclining mechanism defined in claim 13 wherein said carrier members are spaced around said drive gear, and wherein a portion of each of said planetary gears is accommodated between neighboring carrier members.

15. The seat reclining mechanism defined in claim 13, wherein said carrier members are commonly connected and are cross-like in shape.

* * * * *